(12) United States Patent
Hoffmann

(10) Patent No.: US 9,470,290 B2
(45) Date of Patent: Oct. 18, 2016

(54) TORQUE COUPLER

(71) Applicant: Schaeffler Technologies AG & Co. KG, Herzogenaurach (DE)

(72) Inventor: Jan Hoffmann, Rastatt (DE)

(73) Assignee: Shaeffler Technologies AG & Co. KG, Herzogenaurach (DE)

( * ) Notice: Subject to any disclaimer, the term of this patent is extended or adjusted under 35 U.S.C. 154(b) by 8 days.

(21) Appl. No.: 14/414,053

(22) PCT Filed: Jun. 19, 2013

(86) PCT No.: PCT/EP2013/062778
§ 371 (c)(1),
(2) Date: Jan. 9, 2015

(87) PCT Pub. No.: WO2014/009122
PCT Pub. Date: Jan. 16, 2014

(65) Prior Publication Data
US 2015/0204417 A1    Jul. 23, 2015

(30) Foreign Application Priority Data

Jul. 10, 2012 (DE) ........................ 10 2012 211 997

(51) Int. Cl.
*F16F 15/123* (2006.01)
*F16F 15/14* (2006.01)
*F16D 3/66* (2006.01)
*F16F 15/134* (2006.01)

(52) U.S. Cl.
CPC .............. *F16F 15/145* (2013.01); *F16D 3/66* (2013.01); *F16F 15/13484* (2013.01)

(58) Field of Classification Search
CPC .... F16F 15/145; F16F 15/13484; F16D 3/66
USPC ................ 464/1, 3, 68.2; 192/201; 74/574.2
See application file for complete search history.

(56) References Cited

U.S. PATENT DOCUMENTS

| 5,669,478 | A | 9/1997 | Schierling et al. |
| 5,944,610 | A | 8/1999 | Sudau |
| 8,640,449 | B2 * | 2/2014 | Huegel ............. F16F 15/12373 |
| 9,243,670 | B2 * | 1/2016 | Nakagaito ........... F16F 15/1395 |
| 2008/0210049 | A1 | 9/2008 | Rohs |
| 2011/0240429 | A1 | 10/2011 | Heuler et al. |

(Continued)

FOREIGN PATENT DOCUMENTS

| CN | 1120637 | 4/1996 |
| CN | 1896560 | 1/2007 |

(Continued)

*Primary Examiner* — Gregory Binda
(74) *Attorney, Agent, or Firm* — Davidson, Davidson & Kappel, LLC

(57) ABSTRACT

A torque coupler includes an input side and an output side, which are situated rotatably around an axis of rotation, and in addition an intermediate plate for coupling with the input side, an output flange for coupling with the output side, a spring damper for coupling the intermediate plate with the output flange, and a centrifugal force pendulum having a pendulum flange and a pendulum mass. Here the pendulum flange extends between a first area, in which the pendulum flange is attached to the intermediate plate, and a second area, in which the pendulum mass is attached to the pendulum flange. The output flange has a cutout, through which a section of the pendulum flange which connects the two areas runs.

9 Claims, 3 Drawing Sheets

(56) References Cited

U.S. PATENT DOCUMENTS

| | | | |
|---|---|---|---|
| 2014/0194213 A1* | 7/2014 | Verhoog | F16F 15/12373 464/68.2 |
| 2015/0075320 A1* | 3/2015 | Verhoog | F16F 15/145 74/574.2 |
| 2015/0126290 A1* | 5/2015 | Hoffmann | F16D 3/12 |
| 2015/0316124 A1* | 11/2015 | Wirachowski | F16F 15/145 74/574.2 X |

FOREIGN PATENT DOCUMENTS

| | | |
|---|---|---|
| CN | 101124418 | 2/2008 |
| DE | 10 2006 028 777 A1 * | 12/2007 |
| DE | 10 2009 002481 | 6/2010 |
| DE | 10 2010 035 124 A1 * | 3/2011 |
| WO | WO2011/100946 | 8/2011 |
| WO | WO2012172225 | 12/2012 |

* cited by examiner

TORQUE COUPLER

The invention relates to a torque coupler, in particular for use in a drivetrain of a motor vehicle.

BACKGROUND

A torque coupler is used to transmit torque in a drivetrain of a motor vehicle. On the one hand, the torque coupler provides a torsional connection of an output shaft of a drive motor to a drive shaft of a transmission, and, on the other hand, it is set up to damp or cancel out torsional vibrations that are superimposed on the transmitted torque. To that end, the torque coupler includes a spring damper and a centrifugal force pendulum. The spring damper includes an elastic element whose ends are connected to an input side or an output side of the torque coupler, in order to compress or to decompress the spring damper under the influence of a changing torque. The centrifugal force pendulum includes a pendulum flange, on which a pendulum mass is movably situated in the plane of rotation, so that the pendulum mass is moved radially inward or outward under the influence of the angular acceleration, thus reducing or cancelling out the torsional vibration which is the basis of the angular acceleration.

A flange or a disk which transmits the torque from the input side to the spring damper is usually fastened to the pendulum flange by means of a spacer bolt. The spacer bolt is necessary in order to leave an axial intermediate space between the pendulum flange and the other flange or the disk, in which space an output flange for coupling with the output side is located. The spacer bolt is riveted to both flanges during the assembly of the torque coupler. In this design it is disadvantageous that the spacer bolt or riveted connection is not subjected merely to shear during operation of the torque coupler, but that in addition a bending force is also operative, which may reduce the service life of the connection.

SUMMARY OF THE INVENTION

It is an object of the present invention to provide a torque coupler having an improved connection of the pendulum flange to the other flange.

A torque coupler according to the present invention includes an input side and an output side, which are situated rotatably around an axis of rotation, and in addition an intermediate plate for coupling with the input side, an output flange for coupling with the output side, a spring damper for coupling the intermediate plate with the output flange, and a centrifugal force pendulum having a pendulum flange and a pendulum mass. Here the pendulum flange extends between a first area, in which the pendulum flange is attached to the intermediate plate, and a second area, in which the pendulum mass is attached to the pendulum flange. The output flange has a cutout, through which a section of the pendulum flange which connects the two areas runs.

By this means, the pendulum flange can be brought closer to the intermediate plate in the first area, so that a connection, in particular a rivet or bolt connection may be employed with reduced axial leverage. A bending load can be reduced thereby, whereby the life of the connection can be increased. Because of the reduced loading, the connection can also be dimensioned more weakly, which may result in cost benefits, and additional construction space can be gained in the area of the connection.

The pendulum flange is preferably in direct contact with the intermediate plate in the area where it is attached. The attachment of the pendulum flange to the intermediate plate can thus take place completely in cohesive friction, so that a bending loading of a connecting element does not occur. By reducing effective leverage of the fastening element to zero, the fastening element can be subjected exclusively in the axial direction to tension, or possibly also to shear, but not to bending. This achieves a greater strength of the connection.

In an especially preferred embodiment, the cutout is dimensioned so that the section of the pendulum flange which passes through it runs against a boundary of the cutout once a predetermined maximum torsional angle between the intermediate plate and the output flange is reached. The torsional angle correlates with a working stroke of the spring damper. By the striking of the pendulum flange on the boundary of the cutout a stop is formed, which is able to limit the working stroke of an elastic element of the spring damper, and thus to protect the element from overloading. A stop in the area of the elastic element can thus be saved. This makes it possible to gain construction space in the area of the spring damper. Furthermore, through the multiple use of the pendulum flange for different tasks, the torque coupler can be designed more compactly.

In one embodiment, the intermediate plate includes two plate elements that are offset axially and connected to each other, which lie on different axial sides of the output flange, while the pendulum flange is attached to the plate element which faces away from it. A radial length of the plate element which faces toward the pendulum flange can be reduced thereby. This construction suggests itself in particular for an axially cranked output flange.

The cutout may extend in a section of the output flange that runs purely radially, and in a section connected thereto which also runs radially. The strength of the output flange can be reduced only slightly by such a cutout.

The pendulum flange may be cranked, and the cranked zone may run through the cutout. In particular, the pendulum flange and the output flange may be cranked in different axial directions. The pendulum flange can be connected thereby to the output flange in an optimal manner, in order to achieve a compact and frictional arrangement of the elements of the torque coupler.

In a further preferred embodiment, the torque coupler also includes an additional spring damper to couple the input side with the intermediate plate, the two spring dampers being radially offset and concentrically arranged. The pendulum mass attached to the pendulum flange can thereby be axially closely adjacent to the two spring dampers, in order to make optimal use of an available construction space.

In yet another embodiment, the torque coupler may also include a turbine, the turbine and the pendulum flange being attached to the intermediate plate by means of a common connecting element. The common connecting element may be designed in particular as a rivet or bolt, and, as explained earlier, may be subjected to tension or to tension and shear, but not to bending. The integrated attachment of the turbine and of the pendulum flange to the intermediate plate may thus have an increased loading capacity.

BRIEF DESCRIPTION OF THE DRAWINGS

The invention will now be described in greater detail by reference to the accompanying figures, in which the figures represent the following.

DETAILED DESCRIPTION

Figure 1:
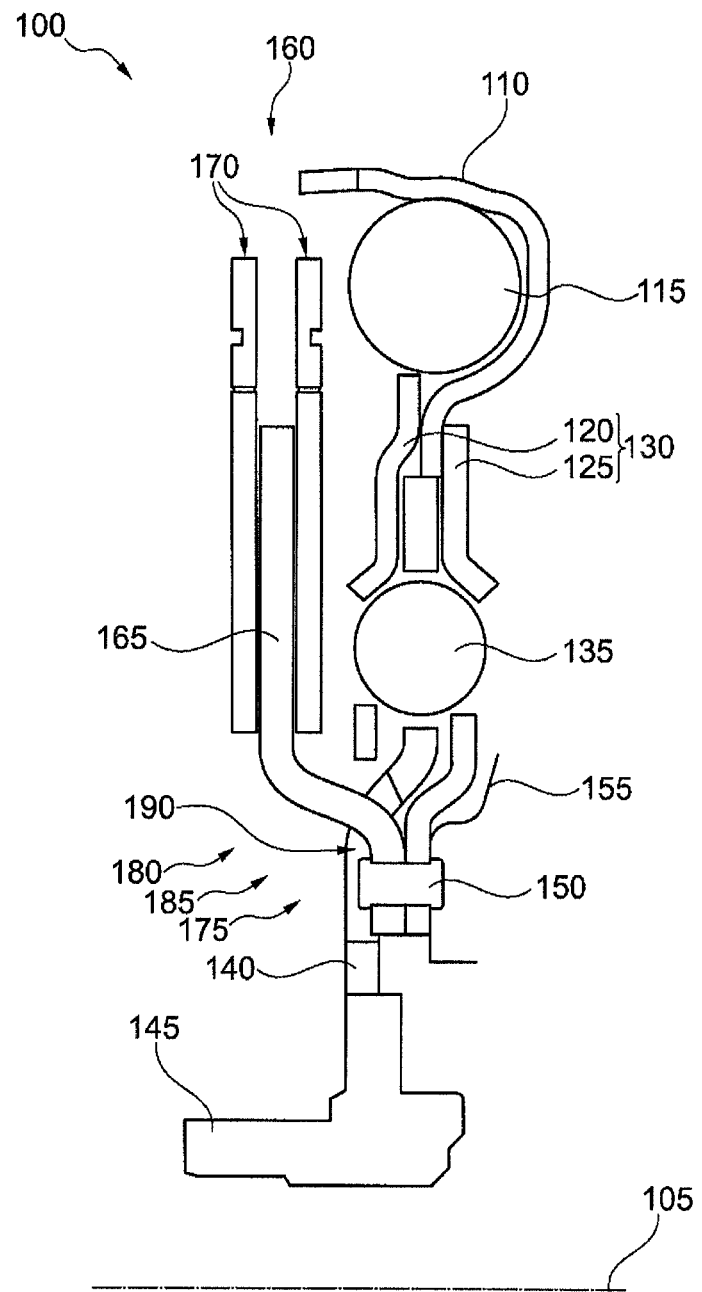
FIG. 1 a sectional view of a torque coupler.

FIG. 1 shows a sectional view of a torque coupler 100. The depiction shows only the upper half of a longitudinal section through an axis of rotation 105, around which the elements of the torque coupler 100 are rotatably positioned.

The depicted torque coupler 100 includes a retainer 110 for connecting to an input side to introduce a torque, a first elastic element 115, a first (here left-side) plate element 120 and a second (here right-side) plate element 120, the plate elements 120 and 125 being enclosed by an intermediate plate 130; also a second elastic element 135, an output flange 140, a hub 145, a connecting element 150, a turbine 155 merely suggested in FIG. 1, as well as a centrifugal force pendulum 160, which includes a pendulum flange 165 and a pendulum mass 170.

Not all of the named components of the torque coupler 100 are absolutely necessary. The focal point of the present invention is the attachment of the pendulum flange 165 to the intermediate plate 130. The remaining elements may also be omitted from different embodiments of the torque coupler 100, or additional elements may be included.

The elastic elements 115 and 135 may be designed as compression springs or as bow springs. At the same time, each of the elastic elements 115 and 135 may be made up of a plurality of individual elastic elements, which are connected to each other in series or in parallel. In a preferred embodiment, at least the first elastic element 115 includes a bow spring. The retainer 110 serves to link torque from the input side to an end of the first elastic element 115, and at the same time to brace the first elastic element 115 radially or axially. An opposite end of the first elastic element 115 is engaged with the intermediate plate 130. By preference, the engagement occurs through a contact of the second end with a section of one of the plate elements 120 or 125 provided for that purpose.

The plate elements 120 and 125 are rigidly joined with each other, for example by means of a riveted connection. In the axial direction between the plate elements 120 and 125 is a section of the output flange 140. The plate elements 120 and 125, similarly to the retainer 110, are set up to brace the second elastic element 135 in a radial or axial direction and to be engaged with one end of the second elastic element 135, in order to transmit a force. The second end of the second elastic element 135 is engaged with a section of the output flange 140, in order to exchange forces with the latter.

The output flange 140 may be connected to the hub 145 in a single piece or in multiple pieces. In a different embodiment, a decoupling of the torque transmitted from the output flange 140 by the torque coupler 100 occurs in a different way than by means of the hub 145.

The pendulum flange 165 is preferably cranked in the axial direction, so that it appears S-shaped in the depicted sectional view. On the pendulum flange 165 there are a radially inner area 175 and a radially outer area 180, between which a middle section 185 is located. In the radially inner area 175 the pendulum flange 165 is connected by means of the connecting element 150 to the intermediate plate 130, in particular to that plate element 125 which lies on the distant axial side of the pendulum flange 165. For the connection, the pendulum flange 165 preferably lies in direct contact with the plate element 125 in the radially inner area 175. The connecting element 150 comprises, for example, a bolt or a rivet. In one embodiment, the connecting element 150 also attaches the turbine 155 to the intermediate plate 130. Preferably, the connecting element 150 extends in the axial direction, while the pendulum flange 165, the intermediate plate 130 and possibly the turbine 155 preferably extend in the connecting area in a purely radial direction.

The middle section 185 of the pendulum flange 165 runs through a cutout 190, which is introduced into the output flange 140. In a preferred embodiment, the output flange 140 is also cranked in the axial direction, with the cranking running in the opposite direction to that of the pendulum flange 165, so that sections of the pendulum flange 165 and of the output flange 140 intercross in an X-pattern.

The cutout 190 may take different axial positions relative to the cranking of the output flange 140. In the depicted, preferred embodiment the cutout 190 covers a purely radially running section, and a section of the output flange 140 that is connected thereto and also runs radially. In the depicted, preferred embodiment, an axial section of the radially inner area 175 of the pendulum flange 165 still lies inside the cutout 190 of the output flange 140. In another embodiment, the lower area 175 can also completely run through the cutout 190 axially.

Figure 2:
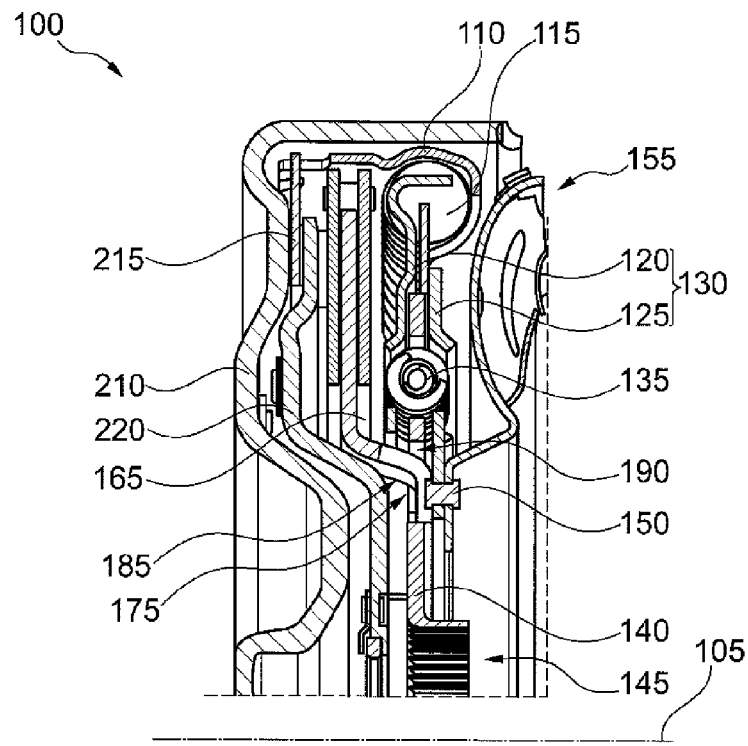
FIG. 2 a sectional view of an expanded torque coupler, based on the torque coupler from FIG. 1.

FIG. 2 shows a sectional view of an expanded torque coupler 100, based on the torque coupler from FIG. 1. The torque coupler 100 depicted here includes additional elements, in order to make it easier to understand how the tie-in of the pendulum flange 165 on the output flange 140 is embedded in the torque coupler 100. It is true here as well that not all depicted or described components of the torque coupler 100 must be used in order to be able to utilize the advantages of the present invention.

As additional elements, compared to the embodiment depicted in FIG. 1, the depicted torque coupler 100 includes a friction clutch 215 and a piston 220. In the depicted, preferred embodiment, the input side 210 is depicted as a housing which encloses the rest of the components of the torque coupler 100. By preference, the torque coupler 100 may run in a fluid bath, in particular an oil bath, which is closed off by the housing. In a radial outer area of the input side 210, the friction plate 215 rests against the latter. A piston 220 is set up to exert an axial force on the friction plate 215, in order to press the latter against the input side 210 and so produce a frictional engagement. The friction plate 215 is torsionally engaged with the retainer 110.

It is clear in FIG. 2 how one end of the first elastic element 115 fits closely with sections of the left plate element 120 in FIG. 2 and of the retainer 110. Also clearly recognizable is the axial passage of the middle section 185 of the pendulum flange 165 through the cutout 190 in the output flange 140, while the output flange 140 in the embodiment of FIG. 2 is integrated with the hub 145.

Figure 3:
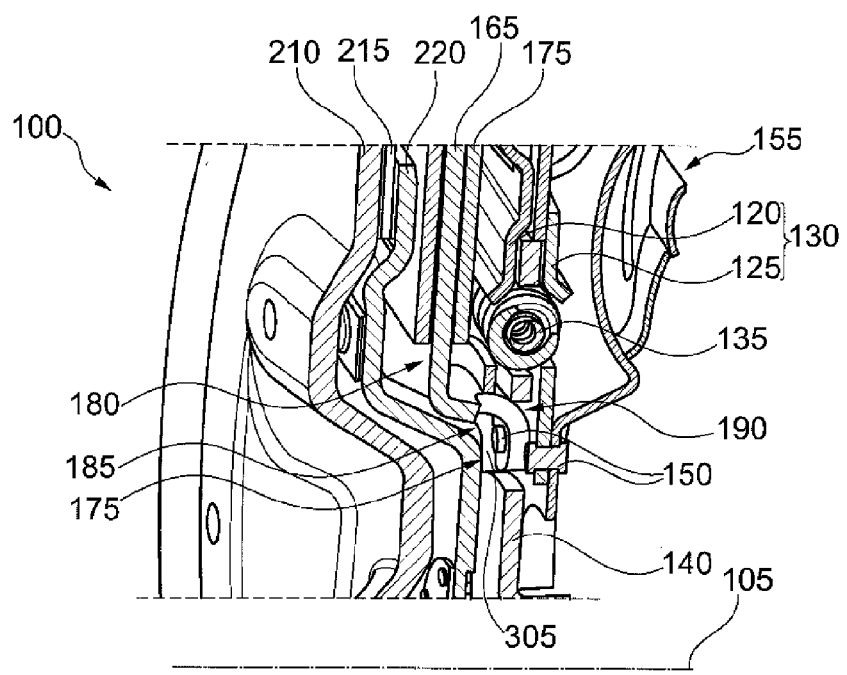
FIG. 3 an oblique view of the torque coupler from FIG. 2.

FIG. 3 shows an oblique view of the torque coupler 100 from FIG. 2. From this perspective it can be seen that in the embodiment shown, different axial connecting elements 150 are used to connect the turbine 155 and the pendulum flange 165 each to the plate element 125 of the intermediate plate 130. In another embodiment, a combined connecting element 150 may also be used for both attachments.

In the perspective shown, a preferred embodiment is recognizable, in which the cutout 190 is dimensioned so that the middle section 185 of the pendulum flange 165 runs against a boundary 305 of the cutout 190 when a predetermined maximum torsional angle between the intermediate plate 130 and the output flange 140 is reached. To that end, the dimensions of the cutout 190 are chosen depending on a width of the middle section 185 of the pendulum flange 165 in the circumferential direction and the magnitude of a maximum torsional angle between the intermediate plate 130 and the output flange 140.

Although only a cutout 190 and a middle section 185 of the pendulum flange 165 that passes through it are depicted, these elements can be repeated on a circumference around the axis of rotation 105, in order to increase a loading capacity of the connection.

Figure 4:
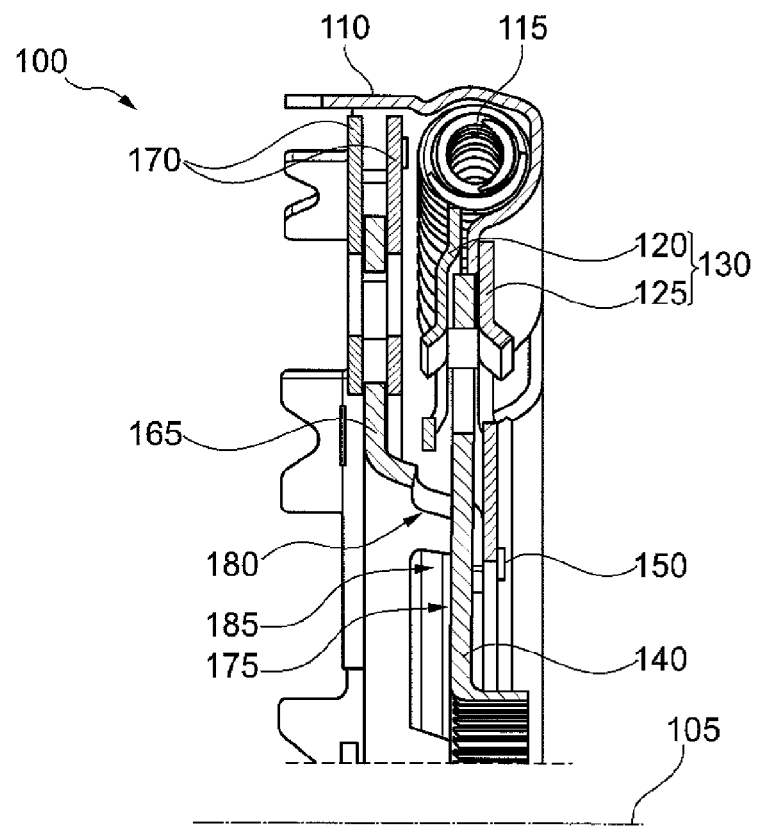
FIG. 4 a sectional view of the torque coupler from FIG. 1 in a different rotational position than in FIG. 2.

FIG. 4 shows a sectional view of the torque coupler 100 from FIG. 1 in a different rotational position than in FIG. 2. In FIG. 4, in particular sections of the side plates 120 and 125 and of the output flange 140, which are set up to be in contact with one end of the second elastic element 135 (not shown), are readily recognizable.

Figure 5:
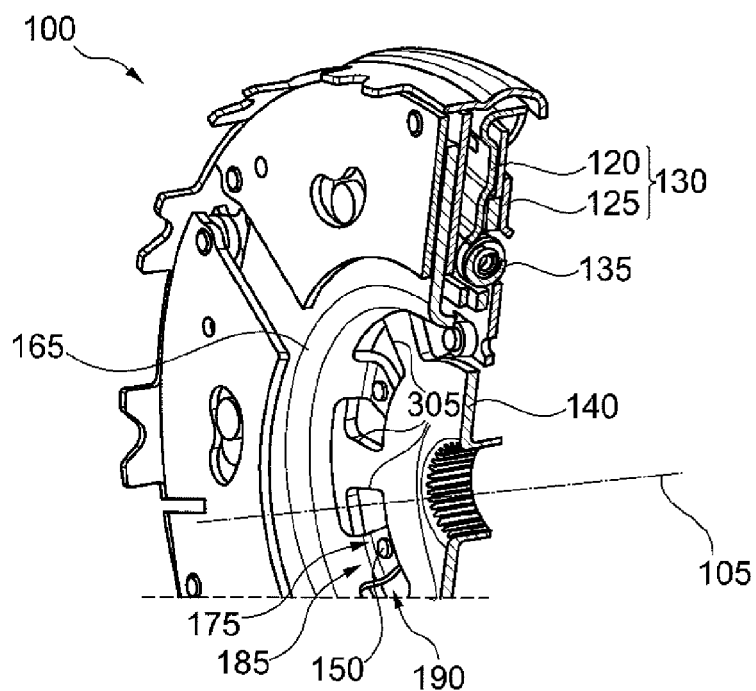
FIG. 5 an oblique view of the torque coupler from FIG. 4.

FIG. 5 shows an oblique view of the torque coupler 100 from FIG. 4. It becomes clear how a plurality of radial appendages is formed on the pendulum flange 165, which protrude through a corresponding plurality of cutouts 190 in the output flange 140 in the axial direction. The middle sections 185 lie along a circumference around the axis of rotation 105, each centered in the cutouts 190, while the second elastic element 135 is in a maximally relaxed position. The second elastic element 135 is compressed against the output flange 140, both with a positive and with a negative rotation of the intermediate plate 130, while the middle section 175 is pushed into the cutout 190 of the output flange in the clockwise or the counter-clockwise direction, until it runs against one of the boundaries 305 and thus limits the compression of the second elastic element 135.

REFERENCE LABELS 100 torque coupler
105 axis of rotation
110 Retainer
115 first elastic element
120 first plate element
125 second plate element
130 intermediate plate
135 second elastic element
140 output flange
145 Hub
150 connecting element
155 Turbine
160 centrifugal force pendulum
165 pendulum flange
170 pendulum mass
175 radially inner area of the output flange
180 radially outer area of the output flange
185 middle section
190 Cutout
205 friction clutch
210 input side
215 friction plate
220 Piston
305 Boundary

The invention claimed is:

1. A torsional vibration coupler comprising:
an input side and an output side, the input side and output side situated rotatably around an axis of rotation;
an intermediate plate for coupling with the input side;
an output flange for coupling with the output side;
a spring damper for coupling the intermediate plate with the output flange;
a centrifugal force pendulum having a pendulum flange and a pendulum mass;
the pendulum flange extending between a first area and a second area, the pendulum flange in the first area being attached to the intermediate plate, the pendulum mass being attached to the pendulum flange in the second area,
the output flange having a cutout, a section of the pendulum flange connecting the first and second areas running through the cutout.

2. The torque coupler as recited in claim 1 wherein the pendulum flange is in immediate contact with the intermediate plate in an attachment area.

3. The torque coupler as recited in claim 1 wherein the cutout is dimensioned so that the section of the pendulum flange runs against a boundary of the cutout when a predetermined maximum torsional angle between the intermediate plate and the output flange is reached.

4. The torque coupler as recited in claim 1 wherein the intermediate plate includes two plate elements axially offset and connected to each other and lying on different axial sides of the output flange.

5. The torque coupler as recited in claim 1 wherein the cutout extends in a radially running section of the output flange.

6. The torque coupler as recited in claim 1 wherein the pendulum flange is cranked and the cranked area runs through the cutout.

7. The torque coupler as recited in claim 1 wherein an axial part of the pendulum flange in the first area lies inside the cutout.

8. The torque coupler as recited in claim 1 further comprising another spring damper for coupling the input side with the intermediate plate, the spring damper and the further spring damper radially offset and concentrically arranged.

9. The torque coupler as recited in claim 1 further comprising a turbine, the turbine and the pendulum flange being attached to the intermediate plate by a common connecting element.

* * * * *